No. 889,310. PATENTED JUNE 2, 1908.
J. H. JOAQUIN.
DRIVE ATTACHMENT FOR VEHICLE WHEELS.
APPLICATION FILED MAY 14, 1907.
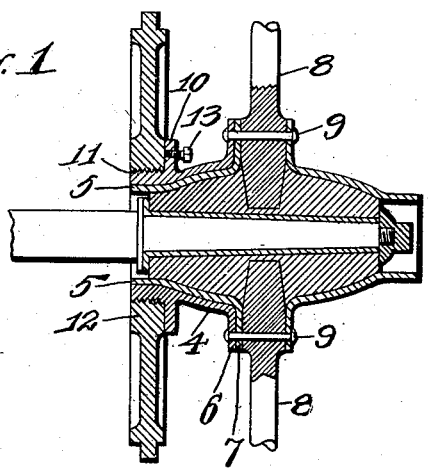
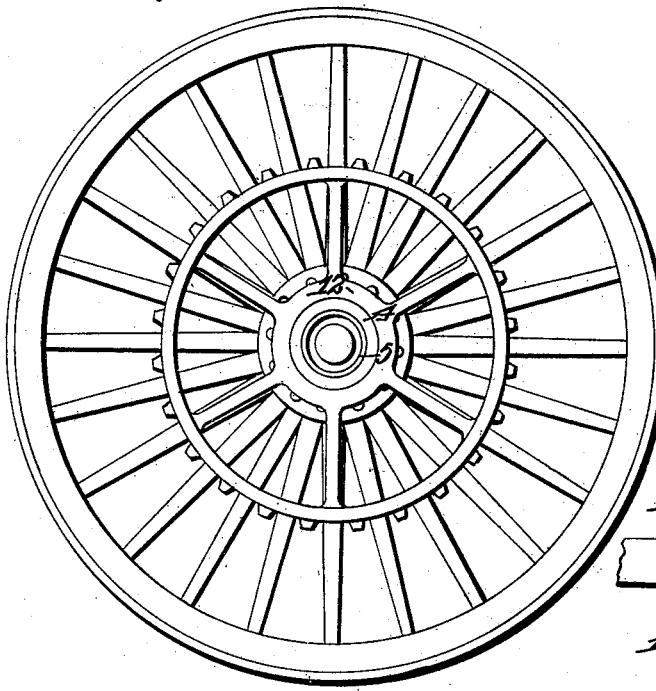
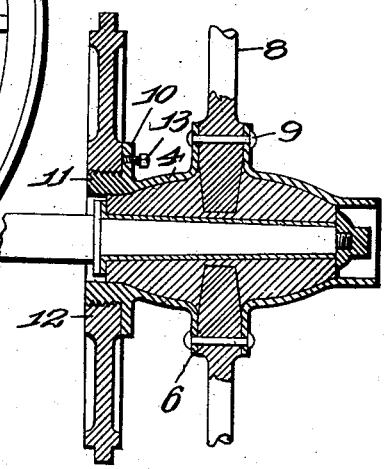
Witnesses
Inventor
Joseph H. Joaquin
by Hopkins & Eicks Attys

UNITED STATES PATENT OFFICE.

JOSEPH H. JOAQUIN, OF ST. LOUIS, MISSOURI.

DRIVE ATTACHMENT FOR VEHICLE-WHEELS.

No. 889,310.  Specification of Letters Patent.  Patented June 2, 1908.

Application filed May 14, 1907. Serial No. 373,688.

*To all whom it may concern:*

Be it known that I, JOSEPH H. JOAQUIN, a citizen of the United States, and resident of St. Louis, Missouri, have invented certain new and useful Improvements in Drive Attachments for Vehicle-Wheels, of which the following is a specification.

This invention relates to improvements in a drive attachment for vehicle wheels, and consists in the novel arrangement, construction, and combination of parts as will be fully hereinafter described and claimed.

The object of my invention is to construct a cap to be placed upon the hub of the vehicle wheel which is directly connected to the spokes of the wheel, and upon the cap is removably attached a sprocket wheel by which the vehicle wheel is propelled when adapted to be used for automobile purposes.

A further object of my invention is to provide a sprocket wheel removably mounted upon a cap and held in locked position when placed upon the cap and to be directly connected to each of the spokes of the vehicle wheel so as to provide rigidity and propel the vehicle wheel without slippage.

In the drawings, Figure 1 is a vertical central sectional view of my invention shown in position upon the hub of an ordinary vehicle wheel. Fig. 2 is a side view of a vehicle wheel showing my device in position. Fig. 3 is a central sectional view of my invention attached to the hub of a vehicle wheel after removing one section of the hub cap.

In the construction of my invention I provide a cap 4 suitably dished to fit over the usual metallic hub cap 5 and it is provided with a radially projecting flange 6 to correspond with the flange 7 of the hub cap, and by which the cap 4 is rigidly retained in position and connected to each spoke 8 of the vehicle wheel by means of the rivets or bolts 9. I also form a radially projecting flange 10 upon the cap 4, and at such location as to provide a threaded shoulder 11 of sufficient width to permit the application of the sprocket wheel 12. The sprocket wheel 12 is also internally screw-threaded to correspond with the threads upon the shoulder 11, and after the sprocket wheel is in position so that its surface and the surface of the flange 10 closely contact the same becomes tightly locked in position upon the cap 4 and to permit the said wheel from unscrewing in the event of backing the wheel, I provide a set screw 13 which is located in the flange 10, the end of said set screw being hollowed forming a cup shaped contacting edge which when tightened will prevent the sprocket wheel from loosening when backing tension is brought upon the wheel.

By referring to Fig. 3 I show the same construction as that shown in Fig. 1, but instead of placing the cap 4 over the ordinary metallic hub cap which is placed on the ordinary vehicle wheels I remove the hub cap 5 and allow my cap 4 to take its place.

The essential feature of my invention is to provide a cap connected directly to the spokes of the wheel and supporting a sprocket wheel which can be easily removed and replaced by a wheel of larger or smaller diameter to accommodate the several speeds desired for automobile purposes. If it is desired to change the speed the sprocket wheel of the required size is placed upon the cap in the position as shown in the drawings. This application of a sprocket wheel upon the hub of a vehicle wheel is used when converting an ordinary vehicle into an automobile so as to provide a proper drive to the wheels of the vehicle.

Applicant is well aware of the existence of a patent which places a sprocket wheel on the hub of a vehicle wheel, but the same is not directly connected or attached to the spokes of the wheel, and therefore, has a tendency to slip upon the hub of the wheel.

Having fully described my invention, what I claim is:

1. A device of the class described, comprising a cap, a flange formed integral with said cap, said cap placed over one half of the hub and retained in position to the spokes of the vehicle by means of said flange, a second flange formed integral with the cap, an externally screw threaded shoulder formed on the cap, and a sprocket wheel removably attached to the cap, substantially as specified.

2. A device of the class described, comprising a cap in combination with a vehicle wheel, a flange located on one end and formed integral with the cap whereby the same is rigidly held in position upon the hub by the rivets which retain the spokes in position upon the hub, a second flange formed integral with the cap forming a shoulder, a sprocket wheel located upon the shoulder and supported by the flange, and a set screw extending through the flange to contact with the sprocket wheel for additionally locking the same in position upon the cap, substantially as specified.

In testimony whereof, I have signed my name to this specification, in presence of two subscribing witnesses.

JOSEPH H. JOAQUIN.

Witnesses:
ALFRED A. EICKS,
WALTER C. STEIN.